United States Patent [19]

Lochhead et al.

[11] 4,420,596

[45] Dec. 13, 1983

[54] PROCESS FOR POLYMERIZING UNSATURATED ACIDS IN MINERAL SPIRITS

[75] Inventors: Robert Y. Lochhead, Avon Lake; John C. Garcia, Lorain, both of Ohio

[73] Assignee: The B. F. Goodrich Company, Akron, Ohio

[21] Appl. No.: 423,913

[22] Filed: Sep. 27, 1982

[51] Int. Cl.$^3$ ................................................. C08F 2/08
[52] U.S. Cl. .................................... 526/212; 526/207; 526/317
[58] Field of Search ............................... 526/212, 207

[56] References Cited

U.S. PATENT DOCUMENTS

| | | | |
|---|---|---|---|
| 3,940,351 | 2/1976 | Schlatzer, Jr. ..................... | 524/795 |
| 3,957,739 | 5/1976 | Eaberstary et al. ................ | 526/207 |
| 3,995,097 | 11/1976 | Brown et al. ........................ | 526/74 |
| 4,328,149 | 5/1982 | Morse et al. ....................... | 526/207 |

*Primary Examiner*—Joseph L. Schofer
*Assistant Examiner*—Peter F. Kulkosky
*Attorney, Agent, or Firm*—J. Hughes Powell, Jr.

[57] ABSTRACT

A method for polymerizing olefinically unsaturated carboxylic acids containing at least one activated carbon to carbon olefinic double bond and at least one carboxyl group in mineral spirits in the presence of a free radical forming catalyst and at least two surface active agents having HLB values of less than 10, a sorbitan ester with a glycerol or alkylene glycol ester and a long chain alcohol, to provide fluid, high total-solid dispersions of polymer in mineral spirits.

10 Claims, No Drawings

PROCESS FOR POLYMERIZING UNSATURATED ACIDS IN MINERAL SPIRITS

BACKGROUND OF THE INVENTION

The preparation of homopolymers and copolymers of polymerizable unsaturated carboxylic acids such as acrylic acid, methacrylic acid, maleic acid, itaconic acid and the like, optionally with other vinylidene monomers and small amounts of cross-linking agents, to form water sensitive polymers is well known. These materials are usually prepared by polymerization of the monomers in the presence of free radical forming catalysts in an organic medium that is a solvent for the monomers, but a nonsolvent for the resulting polymers, in a closed stirred vessel. During the course of the polymerization process, beginning shortly after initiation of polymerization, polymer begins to precipitate from the solution as it is formed. This precipitate often begins to flocculate and form aggregates, causing the reaction mixture to thicken and become difficult to handle and stir. This results in many processing problems, including poor heat transfer, overheating in unstirred areas, localization of unreacted monomer, fouling of reactor surfaces, and irreproducible polymers.

SUMMARY OF THE INVENTION

A novel process for obtaining carboxyl-containing polymers of vinylidene monomers in low viscosity high total solids dispersions in mineral spirits comprising polymerizing said monomers in mineral spirits in the presence of (1) sorbitan ester and (2) glycerol or alkylene glycol ester non-ionic surface active agents having HLB values of less than 10, and (3) long chain alcohols, results in low viscosity polymer dispersions that may have total solids contents as great as about 25 weight percent or more.

DETAILED DESCRIPTION

Slurry viscosity has always been a problem in the polymerization of acrylic acid in solvents for the monomer that are nonsolvents for the polymer. Unsaturated polymerizable carboxylic monomers such as acrylic acid are soluble in mineral spirits and the resulting polymers are insoluble therein. When acrylic acid is polymerized in mineral spirits the polymer particles precipitate as they are formed. Even in early stages of the reaction, these precipitated particles flocculate, and when a certain volume fraction of particles is reached a flocculated structure extends throughout the whole mass of the reaction mixture, often causing the reaction mixture to become pseudoplastic in many reactor configurations. As a result of the shear-thinning nature and yield value characteristic of this pseudoplastic material, momentum transfer from the agitator to the reactor wall is lost and dissipation of the heat of reaction from the center of the reactor to the reactor wall becomes inefficient. Fouling of the reactor, and a limit to the amount of polymer that may be dispersed in a stable reaction mixture are also a consequence of this pseudoplasticity. This becomes more acute as one attempts to obtain high total solids dispersions of carboxyl containing polymers in mineral spirits of greater than about 16 to 20 percent.

When there is critical flocculation of the slurry, and the slurry becomes pseudoplastic, while mixing in the immediate vicinity of the impeller blades may be adequare, the region adjacent to the reactors walls, where normally heat transfer takes place, remains essentially stationary. An insulating layer of reaction product thus may be formed that prevents the desired and necessary heat transfer through the reactor wall to the jacket. This leads to overheating of the charge, a loss of fluidity of the slurry and eventually, fusion of the slurry particles. These problems are often avoided in small reactors with highly efficient agitation and heat transfer surfaces. In large reactors of a variety of geometries and agitation patterns, the flocculation problem may be acute, particularly in wide reactors with minimal agitation, particularly when one is attempting to obtain high total solids dispersions, i.e., greater than about 25 weight percent. In accordance with this invention, when the novel dispersion system of sorbitan esters, glycerol or alkylene glycol esters and the long chain alcohols are used, not only is one able to control the flocculation problem, but low viscosity, high total solids polymers dispersions are readily obtained.

The carboxyl-containing polymers are prepared from vinylidene monomers containing at least one terminal $CH_2<$ group. Such polymers may be homopolymers or copolymers of an unsaturated, polymerizable carboxylic monomer such as acrylic acid, maleic acid, itaconic acid and the like, or copolymers thereof. Typical materials are those described in U.S. Pat. No. 2,798,053. Copolymers, for example, include copolymers of acrylic acid with small amounts of polyalkenyl polyether cross-linkers that are gel-like polymers, which, especially in the form of their salts, absorb large quantities of water or solvents with subsequent substantial increase in volume. Other useful carboxyl containing polymers are described in U.S. Pat. No. 3,940,351, directed to polymers of unsaturated carboxylic acid and at least one acrylic or methacrylic alkyl ester where the alkyl group contains 10 to 30 carbon atoms. Other types of such copolymers are described in U.S. Pat. No. 4,062,817, wherein the polymers described in U.S. Pat. No. 3,940,351 contain additionally another acrylic or methacrylic alkyl ester and the alkyl groups contain 1 to 8 carbon atoms.

The carboxyl-containing polymers have molecular weights greater than about 500 to as high as several million, usually greater than about 10,000 to 900,000 or more. Carboxylic polymers and co-polymers such as those of acrylic acid, methacrylic acid, maleic acid, or the anhydrides thereof also may be cross-linked with cross-linkers as divinyl benzene, unsaturated diesters and the like as is disclosed in U.S. Pat. Nos. 2,340,110; 2,340,111 and 2,533,635.

These materials are normally prepared in organic media as hydrocarbons and chlorinated hydrocarbons, for example benzene, xylene, tetralin, hexane, heptane, carbon tetrachloride, methyl chloride, ethyl chloride and the like. Polymerizations are disclosed, for example, in U.S. Pat. No. 4,062,817 wherein the polymerizations are conducted in the presence of haloethane or halomethane, preferably containing at least 4 halogen atoms, for example, 1,1,2-trichloro-1,2,2-triflouro-ethane. Other carboxyl containing polymers prepared in similar systems include those described in U.S. Pat. Nos. 3,915,921 and 4,066,583.

The carboxylic monomers used in the production of the polymers of this invention are the olefinically-unsaturated carboxylic acids containing at least one activated carbon-to-carbon olefinic double bond, and at least one carboxyl group; that is, an acid containing an olefinic double bond which readily functions in polymerization because of its presence in the monomer molecule, either in the alpha-beta position with respect to a carboxyl group, —C=C—COOH; or as a part of a terminal methylene grouping $CH_2=C<$. Olefinically-unsaturated acids of this class include such materials as the acrylic acids typified by the acrylic acid itself, methacrylic acid, ethacrylic acid, alphachloro-acrylic acid, alpha-cyanoacrylic acid, beta methylacrylic acid (crotonic acid), alpha-phenyl acrylic acid, beta-acryloxy propionic acid, sorbic acid, alpha-chlorosorbic acid, angelic acid, cinnamic acid, p-chlorocinnamic acid, beta-styryl acrylic acid (1-carboxy-4-phenyl butadiene-1,3), itaconic acid, citraconic acid, mesaconic acid, glutaconic acid, aconitric acid, maleic acid, fumaric acid, and tricarboxy ethylene. As used herein, the term "carboxylic acid" includes the polycarboxylic acids and those acid anhydrides, such as maleic anhydride, wherein the anhydride group is formed by the elimination of one molecule of water from two carboxyl groups located on the same polycarboxyl acid molecule. Maleic anhydride and other acid anhydrides have the general structure

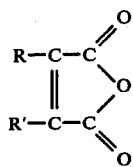

wherein R and R' are selected from the group consisting of hydrogen, halogen and cyanogen (—C≡N) groups and alkyl, aryl, alkaryl, aralkyl, and cycloalkyl groups such as methyl, ethyl, propyl, octyl, decyl, phenyl, tolyl, xylyl, benzyl, cyclohexyl, and the like.

The preferred carboxylic monomers for use in this invention are the monoolefinic acrylic acids having the general structure

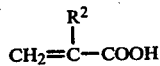

wherein $R^2$ is a substituent selected from the class consisting of hydrogen, halogen, and the cyanogen (—C≡N) groups, monovalent alkyl radicals, monovalent aryl radicals, monovalent aralkyl radicals, monovalent alkaryl radicals and monovalent cycloaliphatic radicals. Of this class, acrylic and methacrylic acid are most preferred because of generally lower cost, ready availability and ability to form superior polymers. Another useful carboxylic monomer is maleic anhydride or the acid.

The polymers contemplated include both homopolymeric carboxylic acids or anhydrides thereof, or the defined carboxylic acids copolymerized with one or more other vinylidene monomers containing at least one terminal $CH_2<$ group. Such materials include, for example, acrylic ester monomers including those acrylic ester monomers derivatives of an acrylic acid represented by the formula

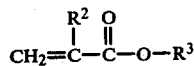

wherein $R^3$ is an alkyl, haloalkyl, cyanoalkyl, and like groups having from 1 to 30 carbon atoms and $R^2$ is hydrogen or a methyl or ethyl group. These acrylic esters are present in the copolymer for some uses in amount from about 5 to 30 weight percent or more. Representative acrylates include methyl acrylate, ethyl acrylate, propyl acrylate, isopropyl acrylate, butyl acrylate, isobutyl acrylate, methyl methacrylate, methyl ethacrylate, ethyl methacrylate, octyl acrylate, heptyl acrylate, octyl methacrylate, isopropyl methacrylate, heptyl acrylate, octyl methacrylate, isopropyl methacrylate, 2-ethylhexyl acrylate, nonyl acrylate, hexyl acrylate, n-hexyl methacrylate, and the like. Representative higher alkyl acrylic esters are decyl acrylate, isodecyl methacrylate, lauryl acrylate, stearyl acrylate, behenyl acrylate and melissyl acrylate and the corresponding methacrylates. Mixtures of two or three or more long chain acrylic esters may be successfully polymerized with one of the carboxylic monomers. One typical useful class of copoly- mers are those methacrylates where the alkyl group contains 10 to 18 carbon atoms. Typical polymers have been made with 15±5 weight percent isodecyl methacrylate, 10±5 weight percent lauryl meth- acrylate, 5±5 weight percent stearyl methacrylate, with acrylic acid.

The polymers also may be cross-linked with any polyfunctional vinylidene monomer containing at least two terminal $CH_2<$ groups, including for example, butadiene, isoprene, divinyl benzene, divinyl naphthlene, allyl acrylates and the like. Particularly useful cross-linking monomers for use in preparing the copolymers, if one is employed, are polyalkenyl polyethers having more than one alkenyl ether grouping per molecule. The most useful possess alkenyl groups in which an olefinic double bond is present attached to a terminal methylene grouping, $CH_2=C<$. They are made by the etherification of a polyhydric alcohol containing at least 4 carbon atoms and at least hydroxyl groups. Compounds of this class may be produced by reacting an alkenyl halide, such as allyl chloride or allyl bromide with a strongly alkaline aqueous solution of one or more polyhydric alcohols. The product is a complex mixture of polyethers with varying numbers of ether groups. Analysis reveals the average number of ether groupings on each molecule. Efficiency of the polyether cross-linking agent increases with the number of potentially polymerizable groups on the molecule. It is preferred to utilize polyethers containing an average of two or more alkenyl ether groupings per molecule. Other cross-linking monomers include for example diallyl esters, dimethallyl ethers, allyl or methallyl acrylates and acrylamides, tetraallyl tin, tetravinyl silane, polyalkenyl methans, diacrylates, and dimethacrylates, divinyl compounds as divinyl benzene, polyallyl phosphate, diallyloxy compounds and phosphite esters and the like. Typical agents are allyl pentaerythritol, allyl sucrose, trimethylolpropane triacrylate, 1,6-hexanediol diacrylate, trimethylolpropane diallyl ether, pentaerythritol triacrylate, tetramethylene dimethacrylate, tetramethylene diacrylate, ethylene diacrylate, ethylene dimethacrylate, triethylene glycol dimethacrylate, and the like. Allyl pentaerythritol, trimethylolpropane diallyl ether and allyl sucrose provide useful cross-linked polymers.

When the optional cross-linking agent is present, the polymeric mixtures usually contain up to about 5 or more percent or more by weight of cross-linking monomer based on the total of carboxylic acid monomer, plus other monomers, if present and more preferably about 0.1 to 2.0 weight percent.

Other vinylidene monomers may also be used, particularly in conjunction with acrylic esters, including the acrylic nitriles, α,β-olefinically unsaturated nitrile useful in the interpolymers embodied herein are preferably the monoolefinically unsaturated nitriles having from 3 to 10 carbon atoms such as acrylonitrile, methacrylonitrile, ethacrylonitrile, chloroacrylonitrile and the like. Most preferred are acrylonitrile and methacrylonitrile. The amounts used, for example, for some polymers are from about 5 to 30 weight percent of the total monomers copolymerized.

Acrylic amides include monoolefinically unsaturated amides that may be incorporated in the inter-polymers of this invention having at least one hydrogen on the amide nitrogen and the olefinic unsaturation is alph-beta to the carbonyl group. Representative amides include acrylamide, methacrylamide, N-methyl acrylamide, N-t-butyl acrylamide, N-cyclohexyl acrylamide, N-ethyl acrylamide and others. Very much preferred are acrylamide and methacrylamide used in amounts, for example, from about 1 to 30 weight percent of the total monomers copolymerized. Other acrylic amides include N-alkylol amides of alpha, beta-olefinically unsaturated carboxylic acids including those having from 4 to 10 carbon atoms such as N-methylol acrylamide, N-ethanol acrylamide, N-propanol acrylamide, N-methylol methacrylamide, N-ethanol methacrylamide, N-methylol maleimide, N-methylol maleamide, N-methylol maleamic acid, N-methylol maleamic acid esters, the N-alkylol amides of the vinyl aromatic acids such as N-methylol-p-vinyl benzamide, and the like and others. The preferred monomers of the N-alkylol amide type are the N-alkylol amides of alpha, betamonoolefinically unsaturated monocarboxylic acids and the most preferred are N-methylol acrylamide and N-methylol methacrylamide used in amounts for example of about 1 to 20 weight percent. N-alkoxymethyl acrylamides also may be used. It is thus intended that where references are made herein regarding the essential N-substituted alkoxymethyl amides, the term "acrylamide" includes "methacrylamide" within its meaning. The preferred alkoxymethyl acrylamides are those wherein the alkyl group contains from 2 to 5 carbon atoms, as N-butoxymethyl acrylamide.

These copolymers may include as little as 8 weight percent of the total polymer of a carboxyl containing monomer, up to 100 percent, i.e., homopolymer. Particularly useful copolymers contain greater than 40 weight percent acid and preferably greater than 70 weight percent.

Other vinylidene comonomers generally include in addition to those described above, at least one other olefinically unsaturated monomer, more preferably at least one other vinylidene monomer (i.e., a monomer containing at least one terminal $CH_2=CH$ group per molecule) copolymerized therewith, for example up to about 30 percent or more by weight of the total monomers. Suitable monomers include α-olefins containing from 2 to 12 carbon atoms, more preferably from 2 to 8 carbon atoms; dienes containing from 4 to 10 carbon atoms including butadiene; vinyl esters and allyl esters such as vinyl acetate; vinyl aromatics such as styrene; vinyl and allyl ethers and ketones such as vinyl methyl ether and methyl vinyl ketone; cyanoalkyl acrylates such as α-cyanomethyl acrylate, the α-,β and τ-cyanopropyl acrylates, vinyl halides and vinyl chloride, vinylidene chloride and the like; esters of maleic and fumaric acid and the like; divinyls, diacrylates and other polyfunctional monomers such as divinyl ether, diethylene glycol diacrylate, ethylene glycol dimethacrylate, methylene-bis-acrylamide, allylpentaerythritol, and the like; and bis (β-haloalkyl) alkenyl phosphonates such as bis (β-chloroethyl) vinyl phosphonate and the like. Copolymers wherein the carboxyl containing monomer is a minor constituent, and the other vinylidene monomers are present on major components are also readily prepared in accordance with the process of this invention.

Polymerization of the monomer in the mineral spirits is usually carried out in the presence of a free radical catalyst in a closed vessel in an inert atmosphere under autogenous pressure or artificially-induced pressure, or in an open vessel under reflux at atmospheric pressure. Temperature of the polymerization may be varied from about 0° to 125° C. or lower or higher. Polymerization at 25° to 90° C. under autogenous pressure using a free radical catalyst is generally effective in producing polymer yields of 75 percent to 100 percent. Typical free radical forming catalysts include peroxygen compounds such as sodium, potassium and ammonium persulfates, caprylyl peroxide, benzoyl peroxide, hydrogen peroxide, pelargonyl peroxide, cumene hydroperoxides, tertiary butyl diperphthalate, tertiary butyl perbenzoate, sodium peracetate, sodium percarbonate, and the like, as well as azo catalysts and azodiisobutyryl nitrile, hereinafter referred to as azoisobutyronitrile. Other catalysts utilizable are the so-called "redox" type of catalyst and the heavy-metal activated catalyst systems. Ultraviolet light may also be used as a source of free radicals. Some systems polymerize solely by heat, but catalysts provide better control. The monomer may be batch charged or continuously added during the course of polymerization or by any other manner of polymerization techniques conventionally used.

The mineral spirits used as the polymerization media in the practice of this invention is a colorless, combustible, petroleum liquid product, normally containing a major proportion of liquid aliphatic hydrocarbon materials. The specific gravity normally ranges from about 0.76 to about 0.79, with a boiling range from about 150° C. to about 200° C. While the flash point is normally above about 40° C., for safety reasons, the flash point may be above about 60° C. A material having a composition of 0 to less than 5 percent aromatics, about 40 to about 80 percent paraffins and about 15 to about 60 percent naphtha, having a flash point above 60° C. produces good results.

The amount of mineral spirits used normally will be in excess of the monomers to be polymerized and while the proportion may vary from at least 1 weight percent of monomers and 99 weight percent mineral spirits up to about 50 weight percent monomers and 50 weight percent mineral spirits, more normally a concentration of about 25 to 45 weight percent monomers is employed to obtain high solids content dispersions.

In the practice of the invention, a variety of nonionic glycerol and sorbitan ester surface active agents may be employed. The improvement of the present invention is in the use of at least one of each of these nonionic surfactants with the alcohol.

The nonionic surfactants useful for purposes of the invention are those falling with the generic classes of sorbitan and glycerol or alkylene glycol esters. Examples of surfactants in the above classes are esters of sorbitan, glycerol and alkylene glycols and monocarboxylic acids containing 8 to 22, preferably linear aliphatic acids containing 12 to 18 carbon atoms in the alkyl group. Typical are sorbitan trioleate; sorbitan tristearate; polyoxyethylene sorbitol stearate; lactylated mono- and diglycerides of fat-forming fatty acids; ethylene glycol fatty acid esters; mono- and diglycerides from the glycerolysis of edible fats; propylene glycol fatty acid mono- and diesters, propylene glycol monostearate; sorbitan sesquioleate; polyoxyethylene sorbitol 4.5 oleate; glycerol monostearate; triglyceryl monooleate; sorbitan monooleate; sorbitan monolaurate; sorbitan partial fatty esters; sorbitan monostearate; diethylene glycol fatty acid esters; polyoxyethylene sorbitol beeswax derivative; polyoxyethylene sorbital laurate; diethylene glycol monolaurate (soap-free); sorbitan monooleate polyoxyethylene ester mixed fatty and resin acids blends; polyoxyethylene sorbitol lanolin derivative; polyoxyethylene sorbitol esters of mixed fatty and resin acids; polyoxyethylene fatty acid; polyoxyethylene sorbitol oleate; polyoxyethylene sorbitan monostearate; polyoxyethylene sorbitol tallow esters; polyoxyethylene sorbitol tall oil; polyoxyethylene sorbitan monooleate; polyoxyethylene sorbitol hexaoleate; polyoxyethylene sorbitan tristearate; and polyoxyethylene sorbitan trioleate; glycerol monooleate; glycerol dioleate; and the like. The alkylene glycol esters are generally esters of alkylene glycols containing 2 to 6 carbon atoms and 2 to 4 hydroxyl groups. Mono- and diesters are preferred.

Mixtures of these surfactant compounds can also be used, for example, mixtures of sorbitan monooleate and sorbitan trioleate and mixtures of glycerol monooleate and glycerol dioleate. Usually the amount of nonionic surfactant employed will be in the range of about one to about 10.0 percent by weight of each of the glycerol and sorbitan ester, based on the weight of the monomer or monomers to be polymerized. Preferably, an amount of each surfactant in the range of about 2 to about 6 percent by weight is employed.

Nonionic surfactants' emulsifying efficiency is related to the polarity of the molecule, that is, the relation between the contribution of the polar hydrophilic head and the nonpolar lipophilic tail. This polarity for nonionic surfactants is defined in terms of an empirical quantity which is called the hydrophilelipophile balance of HLB. The HLB is explained and the method of determining the same is set out in "Nonionic Surfactants" edited by Martin J. Shick at page 604-612, published in 1967 by Marcel Dekker, Inc., New York. For the purposes of the present invention, a nonionic surfactant having an HLB in the range of about 1.0 to about 10 is satisfactory. Excellent results have been obtained with the HLB in the range of about 2.0 to about 6.0. The nonionic surfactants having an HLB in the range of about 1 to about 10 are classified as oil-soluble or monomer-soluble.

In addition to the necessary combination of the glycerol and sorbitan esters, the other essential material necessary in the successful practice of this invention is a long chain monohydric aliphatic alcohol containing at least 8 to 22 carbon atoms, more preferably 10 to 20 carbon atoms. Typical alcohols include octyl alcohol, capryl alcohol, nonyl alcohol, decyl alcohol, undecyl alcohol, lauryl alcohol (1-dodecanol), myristyl alcohol, cetyl alcohol (1-hexadecanol), stearyl alcohol (1-octodecyl alcohol), and the like. Mixtures of these alcohols, normally n-primary alcohols, may be used to good advantage, for example, octyl and myristyl, lauryl and stearyl, and the like. The amount of alcohol used, based on the weight of monomers being polymerized will be from about 3 to 15 weight percent, more normally, about 6 to 12 weight percent.

A group of non-ionic surface active compounds found to be very useful include mono- and diesters of glycerol as sorbitan and glycerol monooleate, glycerol dioleate, glycerol monostearate, glycerol monopalmitate, glycerol dimyristate, glycerol monolaurateoleate, glycerol mono- and di-ricinoleates, sorbitan monolaurate, sorbitan monostearate, sorbitan monooleate, sorbitan dilaurate, sorbitan distearate, sorbitan dioleate, polyoxyethylene sorbitan (4) monostearate, polyoxyethylene sorbitan (5) monooleate, and sorbitan esters of palmitic acid and the like, and mixtures thereof.

In the practice of the invention, the polymerization reactions may be either batch, semi-batch or continuous. The agitation may be any agitation sufficient to maintain the slurry and obtain effective mixing and heat transfer including, for example, helical agitators, pitched turbines and the like. A useful temperature range is from the range of 30° C. to 90° C. at about 1 or more atmospheres. Normal polymerization time is from about 5 to 12 hours.

EXAMPLE I

This Example was run in a closed reactor vessel equipped with a two turbine generator, each turbine consisting of four blades with a 45° pitch, and 4 equally spaced baffles attached to the reactor walls. The agitation was 125 rpm, the reaction temperature was maintained at 74° C. and the pressure on the reactor was kept at 70 Pascals with nitrogen. The reaction was conducted in a combined batch and proportion mode. Three batches of monomers and other reaction ingredients, except catalyst, were separately prepared. The first batch containing all the mineral spirits, minus the catalyst, was charged to the reactor, which was heated and purged with nitrogen to 60° C. At 74° C. the catalyst was added. After 30 minutes the second monomer batch was metered into the reactor at a rate of 1.125 weight parts per minute, and the catalyst at 0.0075 weight parts per minute. At the conclusion of the metering of this first batch, metering of the third monomer batch was commenced at the same rate, and the catalyst at the same rate. The recipe for the batches (all parts are parts by weight) was:

| Ingredient | Batch 1 | Batch 2 | Batch 3 |
|---|---|---|---|
| Acrylic acid | 34 | 54 | 159 |
| Mineral Spirits | 460 | — | — |
| Trimethylol propane diallyl ether | 1.28 | 0.54 | 3.18 |
| Glycerol monooleate-dioleate mixture[1] | 4 | 0.73 | 2.15 |
| Sorbitan monostearate | 5 | 3 | 8.68 |
| Alcohol[2] | 7.6 | 1.8 | 5.35 |
| Catalyst solution: | | | |
| 2-ethyl hexyl peroxy dicarbonate | 0.026 | 0.0375 | 0.118 |
| Mineral spirits | 0.5 | 0.7125 | 2.2 |

[1]50/50 weight percent
[2]Lauryl alcohol blend - 45-54% $C_{12}$, 19-25% $C_{14}$, 15-19% $C_{16}$, and 14-16% $C_{18}$ alcohols.

During the course of the reaction, the maximum viscosity of the reaction mixture was never greater than 120 cps as measured by the Brookfield ($V_{20}$)viscometer.

The resulting product contained 33 weight percent of the acrylic acid copolymer as a dispersion in the mineral spirits and the dispersion had a Brookfield viscosity of 50 cps. The resulting copolymers had mucilage viscosities, at a pH of 7.2 to 7.6, obtained by adding aqueous sodium hydroxide, at the following concentration in water: 1.0 percent—50,000 cps; 0.5 percent—27,000 cps; 0.2 percent—3,400 cps; 0.1 percent—30 cps.

In a run to obtain only 21% total dolids, without the sorbitan monostearate, and with only the glycerol esters and alcohols, the reaction mixture became thick and pseudoplastic, especially during the metering of the second batch, with the viscosity of the reaction mixture reaching about 4,000 cps before becoming so thick that the viscosity could not be reliably measured and there was no effective agitation of the total mixture so the monomer mixture that was being proportioned was not mixed in. The reaction was completely unsatisfactory as to processing, as was the resulting polymer. Dispersion containing as high as 33 percent polymer could not be obtained without the use of the three essential ingredients of this invention. In an attempt to obtain a 24% total solids dispersion with the glycerol ester and alcohol, Brookfield viscosity values of 14,000 cps at 20 rpm were observed and the reaction mixture became almost solid before the reaction was stopped. Unsatisfactory results are obtained when the reaction is repeated with only sorbitan monostearate and the alcohol; and when the reaction is repeated with a mixture of the sorbitan monostearate and glycerol mono- and dioleate mixture, but without the long chain alcohol. Polymerizations with sorbitan monostearate alone have even higher dispersions viscosities, in high total solids recipes, much greater than 15,000 cps. These runs demonstrate the criticality of the combination of the necessary three ingredients to obtain the advantages of the invention.

EXAMPLE II

The procedure of Example I was repeated with a different amount of cross-linking agent used. The amounts of reactants used are set forth below:

| Ingredient | Batch 1 | Batch 2 | Batch 3 |
|---|---|---|---|
| Acrylic acid | 34 | 54 | 159 |
| Mineral spirits | 460 | — | — |
| Trimethylol propane diallyl ether | 0.85 | 0.4 | 1.8 |
| Glycerol monooleate and dioleate mixture | 4 | 0.73 | 2.15 |
| Sorbitan monostearate | 5 | 3 | 8.68 |
| Lauryl alcohol mix | 7.6 | 1.8 | 5.35 |
| Catalyst solution | | | |
| 2-ethyl hexyl peroxy dicarbonate | 0.026 | 0.0375 | 0.118 |
| mineral spirits | 0.5 | 0.7125 | 2.2 |

The maximum viscosity of the dispersion during the reaction was 145 cps, and the final product viscosity was 40 cps. The polymer total solids content of the acrylic acid copolymer dispersion was 33 percent. The polymers had viscosities in water solutions adjusted to pH 7.2-7.6 by addition of aqueous sodium hydroxide as follows: 1 percent—9,400 cps; 0.5 percent—4,800; 0.2 percent—2,060 cps; 0.1 percent—910 cps; 0.05 percent—190 cps. When this example is repeated with other cross-linking agents such as allyl sucrose and allyl pentaerythritol, with other peroxides and other sorbitan esters and glycerol esters of the types set forth above, similar high total solids, low viscosity dispersions are obtained.

These Examples clearly set forth the improvements and advantages obtained when the polymerizations are conducted with the dispersant system of this invention whereby improved viscosity during polymerization is obtained, decreased amounts of undesirable gel are observed and the resulting dispersion in mineral spirits are high enough in polymer content to be economically shipped and be used per se in industrial processes.

In one valuable commercial application, cross-linked acrylic acid polymers, of the types described above, find many uses in the printing industry, as in textile printing. In such processes, the dried polymer is usually slurried in mineral spirits before being "let down" into water during preparation of a print-paste. For such applications, direct polymerization in the mineral spirits not only eliminates the necessary subsequent slurrying step, but provides a low viscosity dispersion when made in accordance with this invention. Further, since the polymer concentration in mineral spirits should exceed at least 30 weight percent, or 33 percent or more, such dispersions also find enhanced application in carpet finishing and in all applications which can accomodate mineral spirits in the final formulation.

We claim:

1. A method comprising polymerizing olefinically unsaturated carboxylic acids containing at least one activated carbon to carbon olefinic double bond and at least one carboxyl group in a polymerization media consisting essentially of mineral spirits in the presence of a free radical forming catalyst, (1) sorbitan ester and (2) glycerol or alkylene glycol ester non-ionic surface active agents having H.L.B. values of less than 10, and (3) a long chain monohydric aliphatic alcohol containing 8 to 22 carbon atoms.

2. A method of claim 1 wherein in said carboxylic acid, said olefinic double bond is in the alpha-beta position with respect to a carboxyl group or is part of a terminal methylene group, said sorbitan ester (1) is a sorbitan mono- or diester of monocarboxylic aliphatic acids containing 8 to 22 carbon atoms, said glycerol ester (2) is a glycerol mono- or diester of monocarboxylic aliphatic acids containing 8 to 22 carbon atoms and (3) said alcohol is a monohydric primary alcohol containing 8 to 22 carbon atoms, each of (1) and (2) being present in amounts from about 1 to about 10 weight percent, and (3) being present in amount of 3 to 15 weight percent, based on the weight of monomers being polymerized.

3. A method of claim 2 wherein said carboxylic acid is selected from the group consisting of acrylic acid, methacrylic acid, and maleic acid.

4. A method of claim 3 wherein said carboxylic acid is acrylic acid present in amounts of greater than 40 weight percent and from 0 to 60 weight percent of at least one other vinylidene monomer containing at least one terminal $CH_2<$ group copolymerized therewith, (1) is a monoester, (2) is a mixture of mono- and diesters, each of said monocarboxylic aliphatic acids contains 12 to 18 alkyl chain carbon atoms and (3) contains 12 to 18 carbon atoms.

5. A method of claim 4 wherein said acrylic acid is present in amount greater than 70 weight percent and there is present less than 5 weight percent of a polyfunctional cross-linking vinylidene monomer containing at least two terminal $CH_2<$ groups.

6. A method of claim 5 wherein said cross-linking agent is selected from the group of allyl pentaerythritol, trimethylolpropane diallylether and allyl sucrose.

7. A method of claim 6 wherein each of (1) and (2) is present in amounts of about 2 to about 6 percent by weight, and (1) is sorbitan monostearate, (2) is a mixture of glycerol monooleate and glycerol dioleate, and (3) is present in amounts from about 6 to 12 weight percent and contains greater than 45 weight percent lauryl alcohol.

8. A method of claim 7 wherein there is present an acrylic acid ester of the formula $$CH_2 = \underset{\underset{R^2}{|}}{C} - \underset{\underset{O}{\|}}{C} - O - R^3$$

wherein $R^2$ is hydrogen, methyl or ethyl and $R^3$ is an alkyl, alkoxy, haloalkyl, or cyanoalkyl group containing 1 to 30 carbon atoms.

9. A method of claim 7 wherein $R^2$ is hydrogen and $R^3$ is an alkyl group.

10. A method of claim 7 wherein $R^2$ is methyl and $R^3$ is an alkyl group.

* * * * *